(12) United States Patent
Thibault et al.

(10) Patent No.: US 6,597,831 B2
(45) Date of Patent: Jul. 22, 2003

(54) LINEAR WAVELENGTH DWDM

(75) Inventors: Simon Thibault, Sainte-Foy (CA); Carl Paquet, San Jose, CA (US); Alain Chandonnet, Cap-Rouge (CA)

(73) Assignee: Institut National d'Optique, Quebec (CA)

( * ) Notice: Subject to any disclaimer, the term of this patent is extended or adjusted under 35 U.S.C. 154(b) by 0 days.

(21) Appl. No.: 09/725,591

(22) Filed: Nov. 29, 2000

(65) Prior Publication Data

US 2002/0094154 A1 Jul. 18, 2002

(51) Int. Cl.$^7$ ................................................. G02B 6/28
(52) U.S. Cl. ............................. 385/24; 385/31; 385/37; 359/114; 359/115
(58) Field of Search ............................. 385/24, 31, 37; 359/114, 115

(56) References Cited

U.S. PATENT DOCUMENTS

| | | |
|---|---|---|
| 4,571,034 A | 2/1986 | Nakamura |
| 4,695,132 A | 9/1987 | Sakuma |
| 4,770,517 A | 9/1988 | Sakuma |
| 4,786,174 A | 11/1988 | Witte, deceased |
| 2002/0009257 A1 * | 1/2002 | Bouevitch et al. ............ 385/24 |

FOREIGN PATENT DOCUMENTS

| | | |
|---|---|---|
| EP | 0595533 | 5/1994 |
| JP | 9089668 | 4/1997 |

* cited by examiner

*Primary Examiner*—Robert H. Kim
*Assistant Examiner*—George Y. Wang
(74) *Attorney, Agent, or Firm*—Merchant & Gould P.C.

(57) ABSTRACT

The present invention concerns a linear wavelength DWDM that is compact and is adapted for use with fibre ribbons and which compensates for the non-linear relationship between equally spectrally spaced wavelengths and physically spaced wavelengths once they have been diffracted. The device includes a first and second port in an optically transmissive medium. The ports are in optical communication with each other through a first and second mirror and a diffraction grating. Preferably, the first mirror is located opposite the first port, and is off-axis with respect to the optical axis. The diffraction grating is located on the same side as the input port, and is in optical communication with the first mirror. The second mirror is located on the same side as the first mirror and is in optical communication with the diffraction grating. The output port is slightly off-axis with respect to the optical axis of the second mirror and is in optical communication therewith. The device compensates for the non-linear relationship between equally spectrally spaced wavelengths and physically spaced wavelengths once they have been diffracted.

18 Claims, 5 Drawing Sheets

LINEAR WAVELENGTH DWDM

FIELD OF THE INVENTION

The present invention relates to a linear wavelength dense wavelength multiplexer-demultiplexer, which is an optical component for DWDM (dense wavelength division multiplexing) systems.

DESCRIPTION OF THE PRIOR ART

An optical communication system comprises three main components: laser sources, optical fibres and detectors. In a DWDM system, different laser sources (i.e. sources operating at different frequencies) are used, and the signal of each source is coupled into a single optical fibre in order to increase the transmission capacity. Devices for coupling in and coupling out are known as multiplexers and demultiplexers. The role of the multiplexer is to simultaneously combine the signal from each laser source into the optical fibre. The role of the demultiplexer is to separate the different wavelengths from the optical fibre to different output fibres, the number of output fibres being equal to the number of wavelengths present.

Typically, multiplexers and demultiplexers use diffraction gratings to combine and separate the signal components in the optical fibres. However, the equally spectrally spaced wavelengths are not equally spaced physically after the reflection on the grating. Consequently, some manufacturers have developed proprietary adapters where the input or output fibres are not linearly spaced, in order to account for the non-linearity of the reflected wavelengths. These proprietary adapters are quite expensive.

This poses particular problems, since fibre ribbon connectors, in which the output or input fibres are physically equally spaced, are used more often and are cheaper than the proprietary adapters.

There is thus a need for a device which matches the relation between the spectral separation and the physical separation of each wavelength when coupling in or coupling out frequencies in a MUX/DEMUX.

SUMMARY OF THE INVENTION

It is an object of the present invention to provide a linear wavelength DWDM device which corrects the relation between the spectral separation and the physical separation of each wavelength.

In accordance with the invention, this object is achieved with a linear wavelength DWDM comprising: a generally rectangular-shaped optically transmissive medium having a constant index of refraction, two opposite ends, two opposite sides and a thickness. The linear wavelength DWDM is provided with a first and second port, each of defining an optical axis. The first port is adapted to receive an optical fibre, and the second port is adapted to receive an optical fibre ribbon comprising a plurality of optical fibres which are physically equally spaced along a line. The first and second ports are in optical communication with each other through a combination of a first mirror, a second mirror and a diffraction grating, the first and second mirrors and the diffraction grating defining an optical path between said first and second ports within said device. The diffraction grating is preferably at an angle $\theta$, and at least one of the first and second mirrors respect an $f\text{-sin}(\theta)$ condition, in order to provide a correction for the non-linear relationship between the spectral spacing between the different wavelengths and the physical spacing thereof.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

The present invention is equally applicable to multiplexers and demultiplexers, but the following description will focus mainly on demultiplexers. It should be understood that for a multiplexer, the description is simply reversed. The invention provides a correction for the non-linear relationship between the reflected angle on a diffracted grating and the incident wavelength.

The present invention is thus a device which performs this correction, and is herein referred to as a linear wavelength DWDM.

As mentioned in the Description of the Prior Art, one device which is commercially available and is used extensively in the art is a fibre ribbon. A fibre ribbon contains a plurality of fibres which are physically equally spaced along a line.

Figure 5:
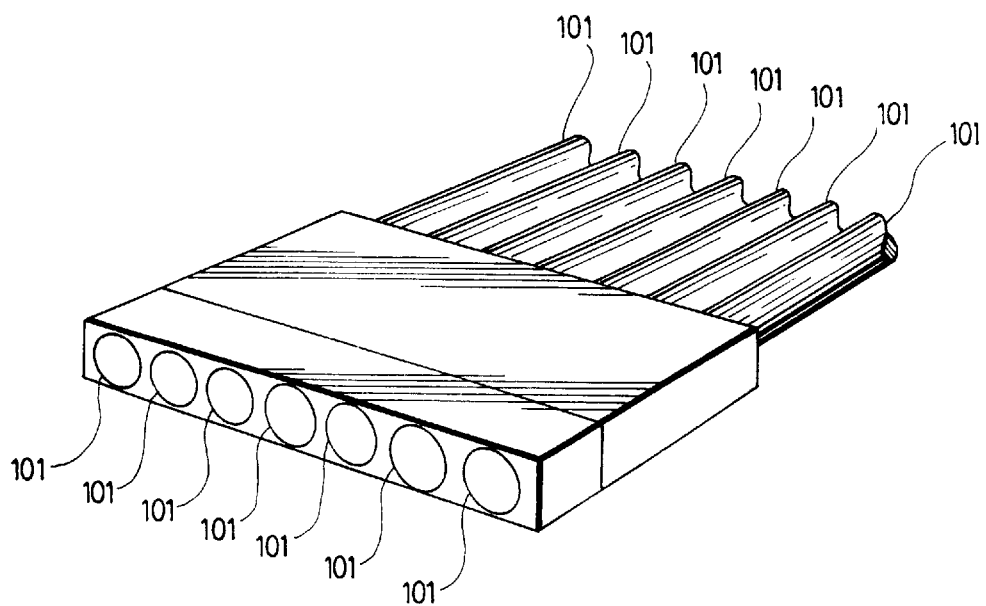
FIG. 5 is a schematic representation of a fibre ribbon.

For a large number of channels in an optical communication channel, it is desirable to keep a constant distance between the output ports in a DEMUX (short for demultiplexer) component when the input wavelengths are spectrally equally spaced, in order precisely to use a fibre ribbon such as one illustrated in FIG. 5 The fibre ribbon 100 includes a plurality of fibre 101 that are equally spaced along a line.

For example, for a DEMUX operating at 1550 nm, containing 16 channels each separated by 100 GHz (0.8 nm), it is desirable that each wavelength be coupled to one fibre in an output fibre ribbon to avoid any crosstalk. For such a purpose, the output image of the DEMUX must lie in a flat plane, while the output spots are equally physically spaced to match the standard commercial fibre ribbon on the output plane.

The invention provides a MUX/DEMUX in which the input fibre and the output fibre ribbon (for a DEMUX, and the reverse for a MUX, i.e. the output fibre and the input fibre ribbon) are attached using standard connectors.

Stated simply, the present invention concerns a linear wavelength DWDM, in which a single fibre containing a plurality of signals (either an input fibre or an output fibre) is connected to a first port. The optical signal propagates in an optically transmissive medium having an index of refraction n, where the medium also has a second port. The optical signal propagates along a signal path defined by a first and second mirror, and a diffraction grating. The purpose of the grating is to spectrally separate the different wavelengths (or combine them in the case of a multiplexer), and the first and second mirrors, alone or in combination, perform a correction linearize the relationship between spectral spacing of the different wavelengths and physical spacing of the different wavelengths.

In a preferred embodiment of the invention, the optical signal, or beam, is injected in the device at the first port and reflected by a first mirror located opposite the first port, and preferably off-axis with respect to the optical axis defined by the first port, the mirror having a radius of curvature R1. The beam is then reflected by a reflective diffraction grating having a period Λ. This grating reflects the spectral components of the beam towards a second mirror, also preferably off-axis with respect to the optical axis of the second port, having a radius of curvature R2. The second mirror reflects and focuses light through a fibre plane in such a way that each wavelength is equally physically spaced and linear.

The device of the present invention is preferably monolithic, meaning that it can be fabricated by injection molding using different polymers, plastic or glasses. This has the advantage of improving the precision of the position of each reflective surface, i.e. mirrors and grating, avoiding the use of moving mechanical parts and thus providing a better coupling in the fibres. Once the molding is done, the mirrors and the diffraction grating are coated using a metallic layer to increase the reflection efficiency.

The optically transmissive medium is chosen to minimise transmission losses at the wavelength of operation, and can be, for example, acrylic for a waveband around 1.3 μm, polycarbonate for a waveband around 1.8 μm and CO550™ for a waveband between around 1 and around 1.7 μm. The injection molding technique further has the advantage of providing low-cost optical components in a highly repeatable process.

As can be understood from the above, the following different parameters will change depending on the operation wavelength: optically transmissive medium, grating period, radius of mirrors, separation of the output fibres and the overall dimensions of the device. The parameters should be selected to provide uniform losses for the different component wavelengths and to minimise polarisation effects. The device can be used with either monomode or multimode fibres. The parameters can be selected using known imagery laws, among others.

The linear wavelength DWDM of the present invention will now be described with respect of a DEMUX, although the description of the function for a MUX is the reverse.

The linear wavelength DWDM comprises a piece of optically transmissive material 100, having two opposite ends 101, 102, two opposite sides 103, 104, a thickness t and a height h. At a first opposite side, proximate a first opposite end 101, an input port 1 is present (for purposes of clarity, the input port of a DEMUX is the output port of a MUX, and the terms input and output should not be understood to be unidirectional, since a device according to the present invention can be used as a MUX or a DEMUX alternatively).

The input port defines first optical axis OA1. Opposite the input port 11 is a first mirror 2 having a radius of curvature R1, where the mirror is preferably slightly off-axis with respect to the optical axis OA1.

The linear wavelength DWDM also includes a reflective grating 3, preferably located on the same opposite side 101 as the input port 1, but between the input port 1 and the opposite end 103. Also present is a second mirror 4, having a radius of curvature R2, preferably located on the same side 102 as the first mirror 2, and closer to the other opposite end.

Finally, an output port 5 is provided opposite the second mirror 4, defining a second optical axis OA2, so that the second mirror 4 is preferably slightly off-axis from the second optical axis OA2.

In use, a polychromatic light beam emerging from an input fibre into port 1 is reflected by the first mirror 2. The reflected light travels through the optical material to the reflective grating 3. The reflective grating reflects the spectral components of the polychromatic light through a second mirror 4. The second mirror 4 reflects the light through an output fibre plane 5, so that the space between each wavelength is adjusted in such a way that a standard optical multifibre connector can be used.

Figure 1:
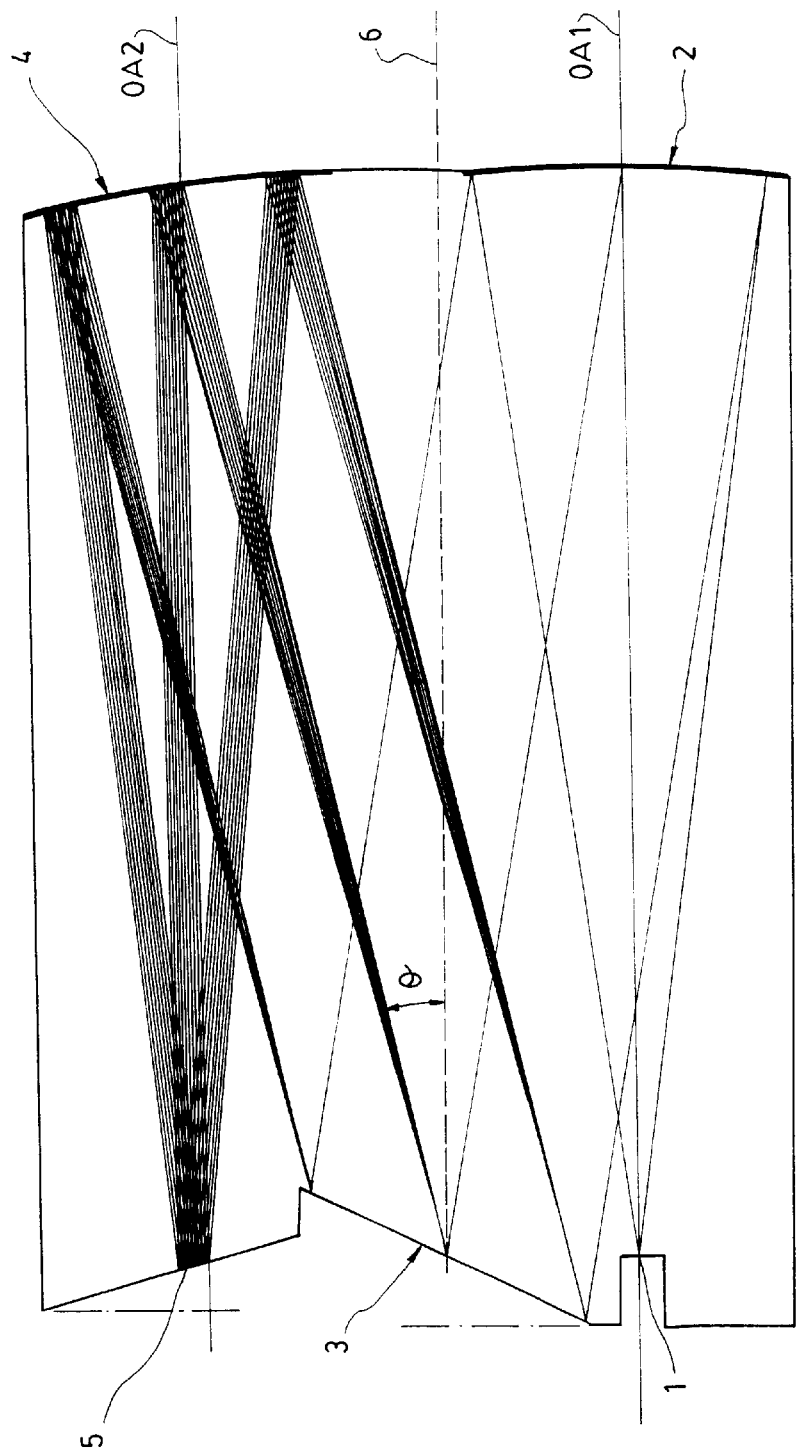
FIG. 1 is a top view of a linear wavelength DWDM according to a preferred embodiment of the invention.

In the embodiment shown in FIG. 1, the polychromatic light is composed of N equally spatially spaced wavelengths. The input fibre can be monomode or multimode, of various core diameters. The propagation of the light beam from the input plane to the output plane is preferably not through air, but rather through acrylic or polycarbonate or molded glass such as Corning CO550™.

The first concave mirror is preferably a metallic mirror directly shaped and coated in the optical material.

The diffraction grating is preferably etched into the substrate and then metalised. The grating groove shape can be optimised regarding the waveband, the polarisation of light and the dispersion of the grating (number of lines per mm). More specifically, in view of the characteristics of the incident light on the gratings, the shape of the grooves of the gratings will be different (i.e. triangular, square or trapezoidal). This is well within the purview of a person skilled in the art by performing an electromagnetic analysis.

The second mirror is made in the same manner as the first mirror.

The output plane is planar, and in contact with a multifibre connector, i.e. a ribbon.

The precise shape and position of the first and second concave mirrors is preferably optimised to respect an f-sin (θ) condition. This condition is described in co-pending U.S. application Ser. No. 09/406,576 of Sep. 24, 1999, assigned to the same assignee, the contents of which are incorporated by reference. This can be obtained by introducing an appropriate amount of distortion in the optical system, such as by a proper merit function available in any optical design software. The distortion introduced by mirrors respecting a f-sin(θ) condition is necessary to obtain a linear wavelength distribution in the output plane, which is a principal object of the present invention.

In fact, the f-sin(θ) output plane relationship is an f-λ output plane relationship where the angle θ is the diffraction angle of the diffraction grating. In the present invention, the system is optimised in such a way that the distortion introduced by the optical system is a function of sin(θ), where θ is the diffraction angle of the diffraction grating.

The f-sin(θ) characteristic can be evaluated by the difference between the ideal position of the spot at a defined wavelength, and the real position of the spot.

Figure 2:
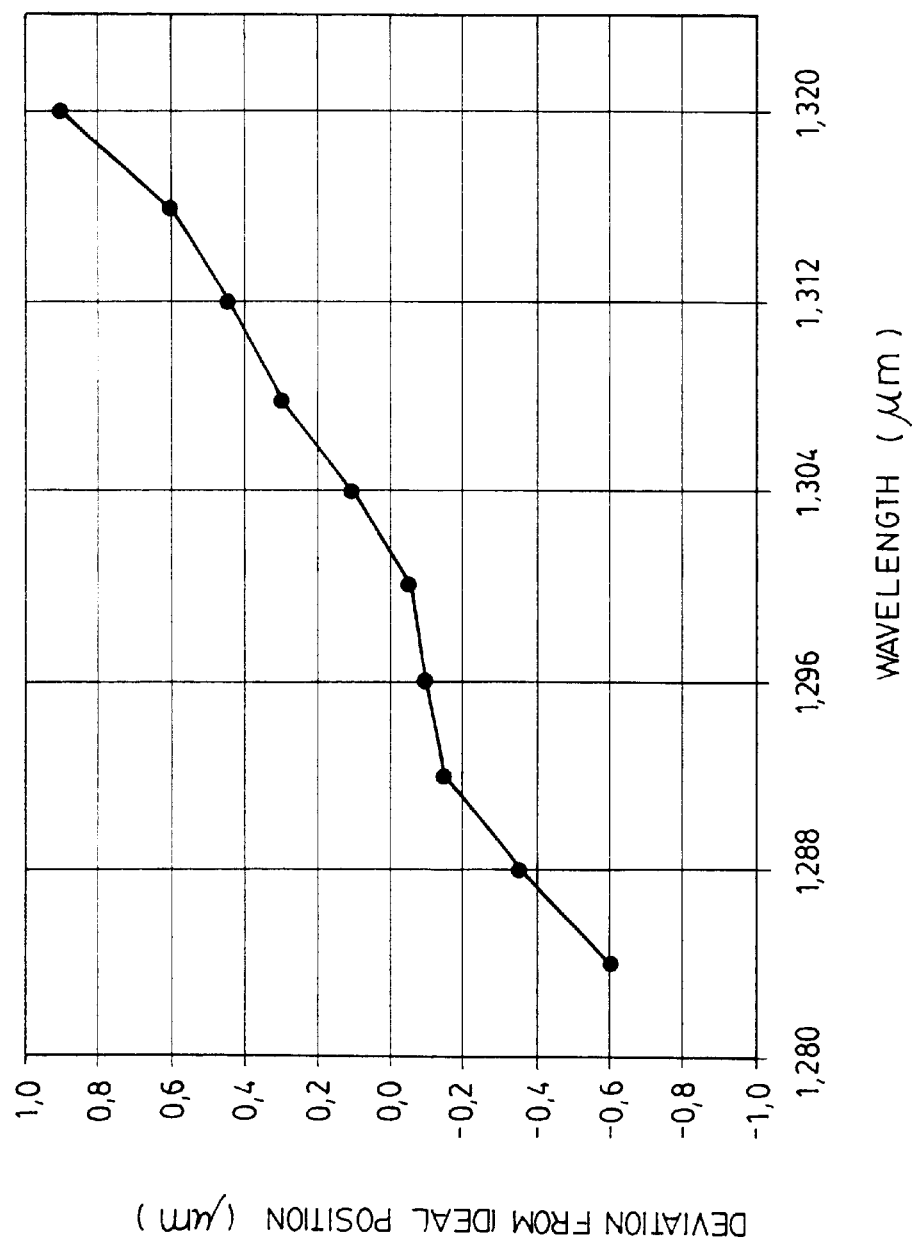
FIG. 2 is a graph showing the linear error function in the output fibre plane according to an example of the preferred embodiment of the invention.

The characteristic means a deviation from an ideal correction. For optical fibre devices as in the present invention, the difference between the ideal and real position of the light spot has to be in correlation with the tolerance on the multifibre connector. If the space error between each fibre is 1 μm, then the f-sin(θ) characteristic must have the same error of 1 μm. This level of precision is difficult to obtain, but can be attained with the concept of f-sin(θ) and by proper optimisation. FIG. 2 shows the benefit of the correction. As can be seen, the spots now lie in a line within 1 μm, and centered at about 125 μm (0.0 on the graph). Such a correction thus makes the device of the present invention particularly useful for use with fibre ribbons.

Figure 3:
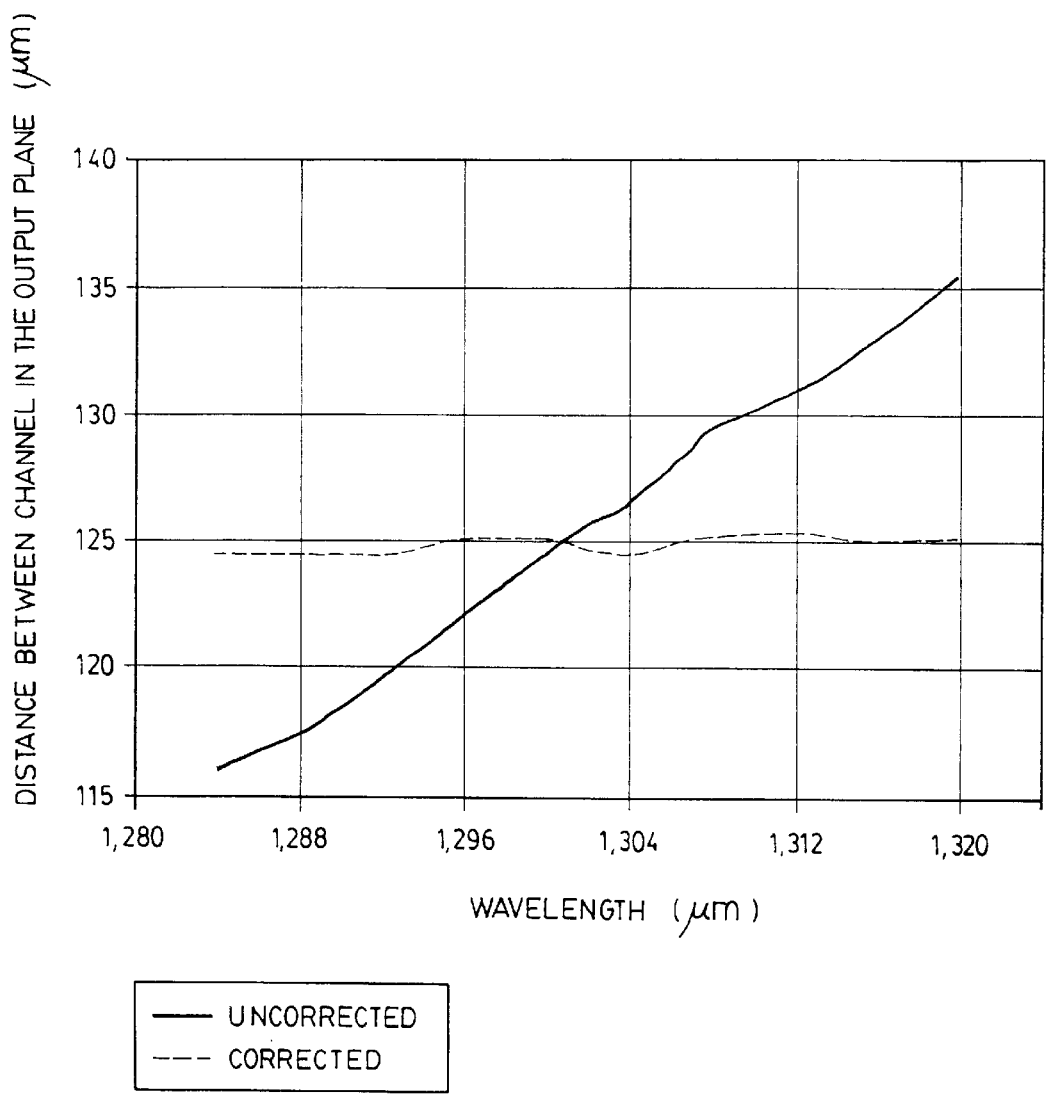
FIG. 3 is a graph showing the distance with respect to wavelength, between a corrected linear wavelength DWDM and an uncorrected linear wavelength DWDM.
Figure 4:
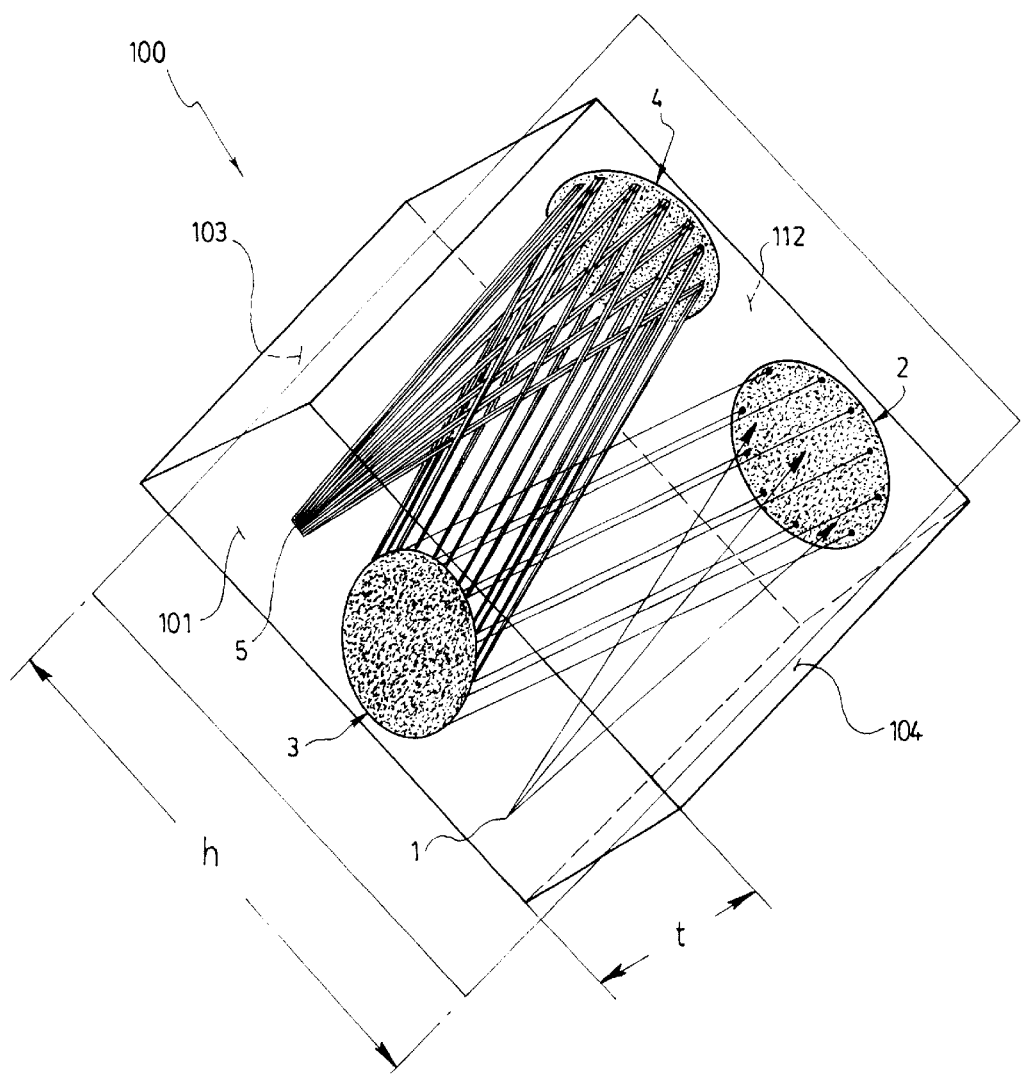
FIG. 4 is a schematic perspective view of the manner in which light travels in the linear wavelength DWDM of FIG. 1.

By contrast, and referring now to FIG. 3, there is shown the results between a device according to the present invention, where the device is optimised to respect a sin(θ) characteristic (dotted line), and a device which has not been optimised (solid line). As can be seen, in the uncorrected version, the channels in the output plane are separated by a distance which increases as the wavelength increases, starting with a separation of approximately 115 μm at a wavelength of approximately 1.284 μm to a separation of a bit more than 135 μm at a wavelength of approximately 1.320 μm. The non-linear relationship between the spectral separation of the wavelengths and the physical separation of the wavelengths is clearly shown. By contrast, the device according to a preferred embodiment of the present invention shows that a correction can be performed, so that the separation is approximately 125 μm between each of the wavelengths.

The spectral linearity is then obtained in the output plane by the f-sin(θ) property and the value of the spacing in the output plane is obtained by combining the grating dispersion, the grating angle and the focal length of the second mirror. For example, the preferred embodiment of the present invention is designed to provide a separation of 125 μm between each wavelength; however, a solution can also be designed where the separation is 250 μm.

The aberration control is performed through the optimisation process using the curvature and aspheric coefficients of each mirror, the internal distances and the angle of the output fibre plane.

The mirrors used in the present invention can be described by the following equation:

$$z = \frac{c \cdot r^2}{1 + \sqrt{1 - (1+k)c \cdot r^2}} + \alpha_1 \cdot r^2 + \alpha_2 \cdot r^4 + \alpha_3 \cdot r^6 + \alpha_4 \cdot r^8$$

where c is the curvature and k the conic constant. The optimisation process is performed by varying the curvature, the conic constants and the aspheric coefficients $\alpha_i$. For better results, the decentering and tilt of all of the surfaces can be varied. The diffraction grating is described only by line density. However, the shape of the groove is optimised from an electromagnetic theory to get the more efficient structure regarding the wavelength and the line density, as mentioned previously.

The structure appearing on FIG. 1 was built according to the following parameters:

The material used is acrylic, having an index of refraction at 20° C. and 1 atm of n=1.483382 at a wavelength of 1.284 μm, to n=1.483564 at a wavelength of 1.32 μm.

The input fibre was a monomode SMF-28 fibre.

The first concave mirror is located 35 mm from the input fibre with a decenter of 6 mm from the optical axis. The first concave mirror has the following parameters: c=1/70 mm$^{-1}$, $\alpha_1$=−0.0001593, $\alpha_2$=−4.9832×10$^{-7}$, $\alpha_3$=3.5492×10$^{-9}$, and $\alpha_4$=−1.0336×10$^{-11}$.

The diffraction grating is located 35 mm from the first concave mirror. The grating line density is 1 line/μm and the grating is used in the first order. The grating is tilted by an angle θ=24.75°.

The second concave mirror is located 35 mm from the diffraction grating and has the following parameters: c=1/70 mm$^{-1}$, $\alpha_1$=−0.0001861, $\alpha_2$=3.9776×10$^{-7}$, $\alpha_3$=−8.09435×10$^{-10}$, and $\alpha_4$=5.3394×10$^{-13}$.

The output fibre plane is located 35 mm from the second mirror and decentered by 8.2839 mm from the optical axis. The plane is tilted by an angle of 15.479° from the side of the optical material. With these parameters, each wavelength is imaged in the output plane with a spacing between each spectral component of 125 μm+/−1 μm. The spot size is 32 μm for each wavelength for a numerical aperture of 0.2.

The wavelengths in the polychromatic beam range from 1.284 μm to 1.320 μm, and are spaced by 4 nm. The polychromatic light is thus composed of 10 different wavelengths.

The losses inside the device, excluding the optical coupling efficiency, is 2 dB.

Although the present invention has been explained hereinabove by way of a preferred embodiment thereof, it should be pointed out that any modifications to this preferred embodiment within the scope of the appended claims is not deemed to alter or change the nature and scope of the present invention.

For example, the grating can be located elsewhere in the device, i.e. at the port 1. This would make a more compact device. However, such a solution also introduces specific design issues. Also, the mirrors do not need to be decentered, although it does simplify the optimisation process. Finally, all of the angles can be varied. However, if the angle of plane 5 is reduced, the groove density must be increased, which would make the device less compact that the solution presented for a preferred embodiment thereof.

What is claimed is:

1. A linear wavelength DWDM comprising:
    a generally rectangular-shaped optically transmissive medium having a constant index of refraction, two opposite ends, two opposite sides and a thickness;
    a first port defining a first optical axis for connection to an optical waveguide carrying a polychromatic signal, said signal being composed of at least two discrete signals that are spectrally equally spaced;
    a first mirror having a radius of curvature R1 fabricated on said medium, said first port and said first mirror being in optical communication;
    a reflective grating fabricated on said medium, said reflective grating being in optical communication with said first mirror;
    a second mirror having a radius of curvature R2, said second mirror being fabricated on said medium, said second mirror being in optical communication with said reflective grating; and
    a second port defining a second optical axis, said second port being in optical communication with said second mirror, said second port being for connection to a ribbon waveguide containing at least two optical waveguides, each of said waveguides carrying one of said at least two discrete signals, the at least two discrete signals being physically equally spaced.

2. A linear wavelength DWDM according to claim 1, wherein said first mirror is off-axis.

3. A linear wavelength DWDM according to claim 2, wherein said first mirror and said second mirror are located on the other opposite side from the first port, and the reflective grating and the second port are located on the same opposite side as the first port.

4. A linear wavelength DWDM according to claim 1, wherein said second mirror is off-axis.

5. A linear wavelength DWDM according to claim 4, wherein said reflective grating is at an angle θ with respect to said first opposite side.

6. A linear wavelength DWDM according to claim 3, wherein said second port is at an angle with respect to said first opposite side.

7. A linear wavelength DWDM according to claim 4, wherein said first port and said first mirror are separated by a distance of 35 mm.

8. A linear wavelength DWDM according to claim 4, wherein said second port and said second mirror are separated by a distance of 35 mm.

9. A linear wavelength DWDM according to claim 1, wherein said optical waveguide is a single mode or multi-mode fibre, and wherein said optical ribbon waveguide is an optical fibre ribbon.

10. A linear wavelength DWDM according to claim 1, wherein said first and second mirrors are concave.

11. A linear wavelength DWDM according to claim 1, wherein said linear wavelength DWDM is adapted to be used with wavelengths in the range of 1.284 $\mu$m to 1.320 $\mu$m.

12. A linear wavelength DWDM according to claim 1, wherein said first and second mirrors and said grating are further mettallised.

13. A linear wavelength DWDM according to claim 1, wherein said first and second mirrors are decentered with respect to the first and second optical axes respectively.

14. A linear wavelength DWDM according to claim 1, wherein at least one of said first and second mirrors respect a f-sin($\theta$) condition.

15. A linear wavelength DWDM according to claim 14, wherein both of said first and second mirrors respect said f-sin($\theta$) condition.

16. A linear wavelength DWDM comprising: a generally rectangular-shaped optically transmissive medium having a constant index of refraction, two opposite ends, two opposite sides and a thickness; said linear wavelength DWDM being provided with a first and second port, each of said first and second ports defining an optical axis; said first port being adapted to receive an optical fibre, said second port being adapted to receive an optical fibre ribbon comprising a plurality of optical fibres which are physically equally spaced along a line; said first and second ports being in optical communication with each other through a combination of a first mirror, a second mirror and a diffraction grating, said first and second mirrors and said diffraction grating defining an optical path between said first and second ports within said device.

17. A linear wavelength DWDM according to claim 16, wherein said diffraction grating is at an angle $\theta$.

18. A linear wavelength DWDM according to claim 17, wherein at least one of said first and second mirrors respects an f-sin($\theta$) condition.

* * * * *